United States Patent [19]
Takano et al.

[11] Patent Number: 5,761,437
[45] Date of Patent: Jun. 2, 1998

[54] AUDIO SIGNAL, PROCESSING CIRCUIT AND VIDEO/AUDIO DECODER

[75] Inventors: Hideto Takano; Hideki Sakamoto, both of Tokyo, Japan

[73] Assignee: NEC Corporation, Tokyo, Japan

[21] Appl. No.: 530,835

[22] Filed: Sep. 20, 1995

[30] Foreign Application Priority Data

Sep. 26, 1994 [JP] Japan ................................ 6-229892

[51] Int. Cl.⁶ ........................................... H04N 1/36
[52] U.S. Cl. ........................... 395/200.77; 348/423
[58] Field of Search .................. 364/514 R, 514 A; 370/503, 510; 348/423, 426, 474; 358/409, 436; 395/551, 559, 200.77; 386/48, 104, 119, 123

[56] References Cited

U.S. PATENT DOCUMENTS

| | | | |
|---|---|---|---|
| 4,703,369 | 10/1987 | Moriyama et al. | 386/97 |
| 5,513,128 | 4/1996 | Rao | 364/514 R |
| 5,539,663 | 7/1996 | Agarwal | 364/514 R |
| 5,598,352 | 1/1997 | Rosenau et al. | 364/514 A |

*Primary Examiner*—James P. Trammell
*Assistant Examiner*—Thomas Peeso
*Attorney, Agent, or Firm*—Ostrolenk, Faber, Gerb & Soffen, LLP

[57] ABSTRACT

An audio signal processing circuit has a synchronizing pattern detector, an unformatter, a synthesizing filter, an output latch, and a sequence generator. The sequence generator starts to operate the unformatter and the synthesizing filter from the time of the synchronizing pattern in the audio bit stream, and then temporarily stops the operation of the unformatter and the synthesizing filter when a first sample of the audio signal is stored in the output latch. In response to an audio start signal, the sequence generator starts to operate the unformatter and the synthesizing filter again to output an audio signal without a synchronization time error.

2 Claims, 7 Drawing Sheets

AUDIO SIGNAL, PROCESSING CIRCUIT AND VIDEO/AUDIO DECODER

BACKGROUND OF THE INVENTION

1. Field of the Invention

The present invention relates to an audio signal processing circuit for expanding a compressed digital audio signal and synchronizing a video signal accompanying the compressed digital audio signal.

2. Description of the Prior Art

There have recently been rapidly growing demands for capabilities to handle video and audio information in various fields. Since video and audio signals represent a much larger amount of information than signals representing symbols such as numerals, compression techniques have been developed for transmitting and storing video and audio information efficiently by reducing the video and audio information to a fraction of the original amount. One typical compression technique is MPEG standards according to ISO/IEC-11172. The MPEG standards are classified into four groups of system, video, audio, and standard agreement test standards. The system standards are provided for processes of superposing and synchronizing coded video and audio information.

Decoders for expanding audio signals that have been compressed according to the MPEG standards may be designed according to the audio standards of MPEG. In most cases, however, such decoders have to take into account the system standards of MPEG because they handle audio signals that accompany video signals. Therefore, those decoders are required to be able to adjust audio signal output times for synchronization with video signals.

Figure 1:
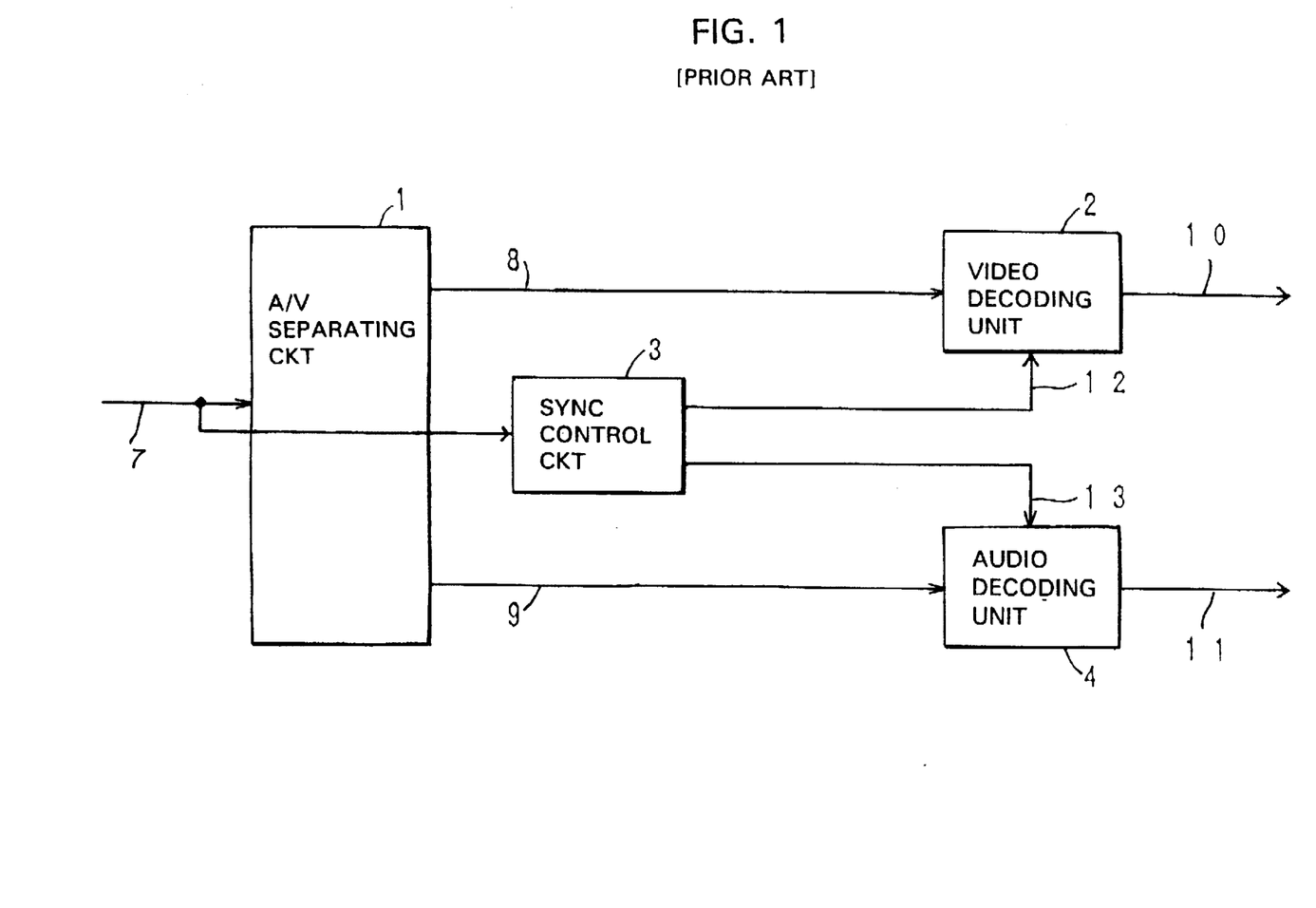
FIG. 1 is a block diagram of a conventional decoder according to MPEG standards.

FIG. 1 of the accompanying drawings shows in block form a conventional decoder for handling video and audio signals according to the MPEG system standards.

As shown in FIG. 1, an A/V separating circuit 1 separates an MPEG bit stream 7 into a video bit stream 8 and an audio bit stream 9. A video decoding unit 2 is a block including a video decoder, and decodes the video bit stream 8 and outputs a video signal 10. A synchronization control circuit 3 outputs video and audio start signals 12, 13 for synchronizing video and audio signals. An audio decoding unit 4 is a block including an audio decoder, and decodes the audio bit stream 9 and outputs an audio signal 11.

According to synchronization information contained in the MPEG bit stream 7, the synchronization control circuit 3 applies the video and audio start signals 12, 13 to the video decoding unit 2 and the audio decoding unit 4, respectively, at an appropriate time for thereby accomplishing synchronization of video and audio signals.

A process of synchronizing audio signals will be described below.

Figure 2:
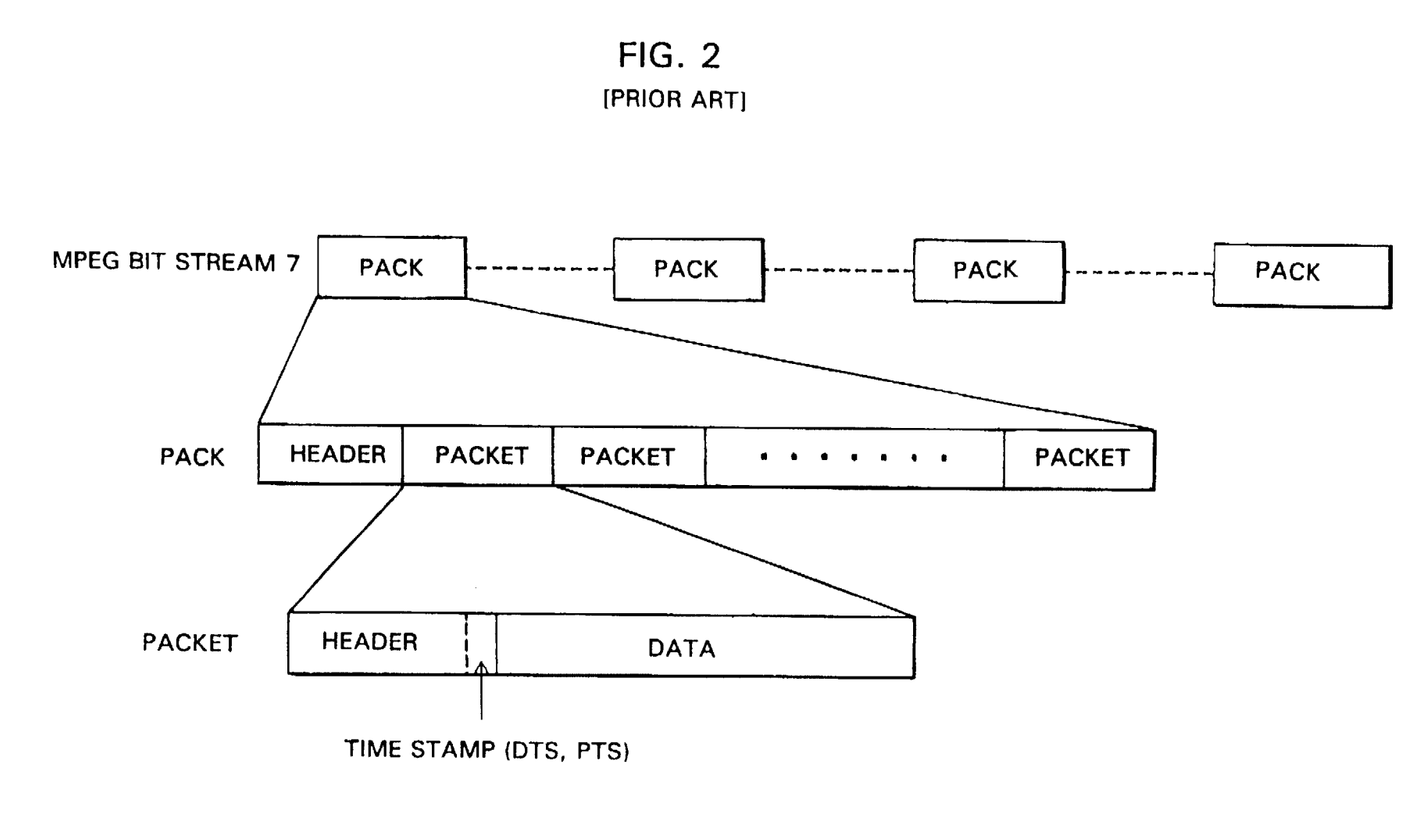
FIG. 2 is a schematic diagram showing an MPEG bit stream.

The audio signal synchronizing process is carried out by recording information relative to a start time of the audio decoding unit 4 in the beginning of a packet of the MPEG bit stream 7, and controlling the audio decoding unit 4 according to the recorded start time. The MPEG bit stream 7 is schematically shown in FIG. 2 of the accompanying drawings. There are two audio signal synchronizing processes known as DTS (Decoding Time Stamp) and PTS (Presentation Time Stamp), respectively.

First, the DTS process will be described below. The DTS represents a time for the audio decoder to decode the audio bit stream 9. The audio decoding unit 4 which operates on the DTS is shown in detail in FIG. 3 of the accompanying drawings.

Figure 3:
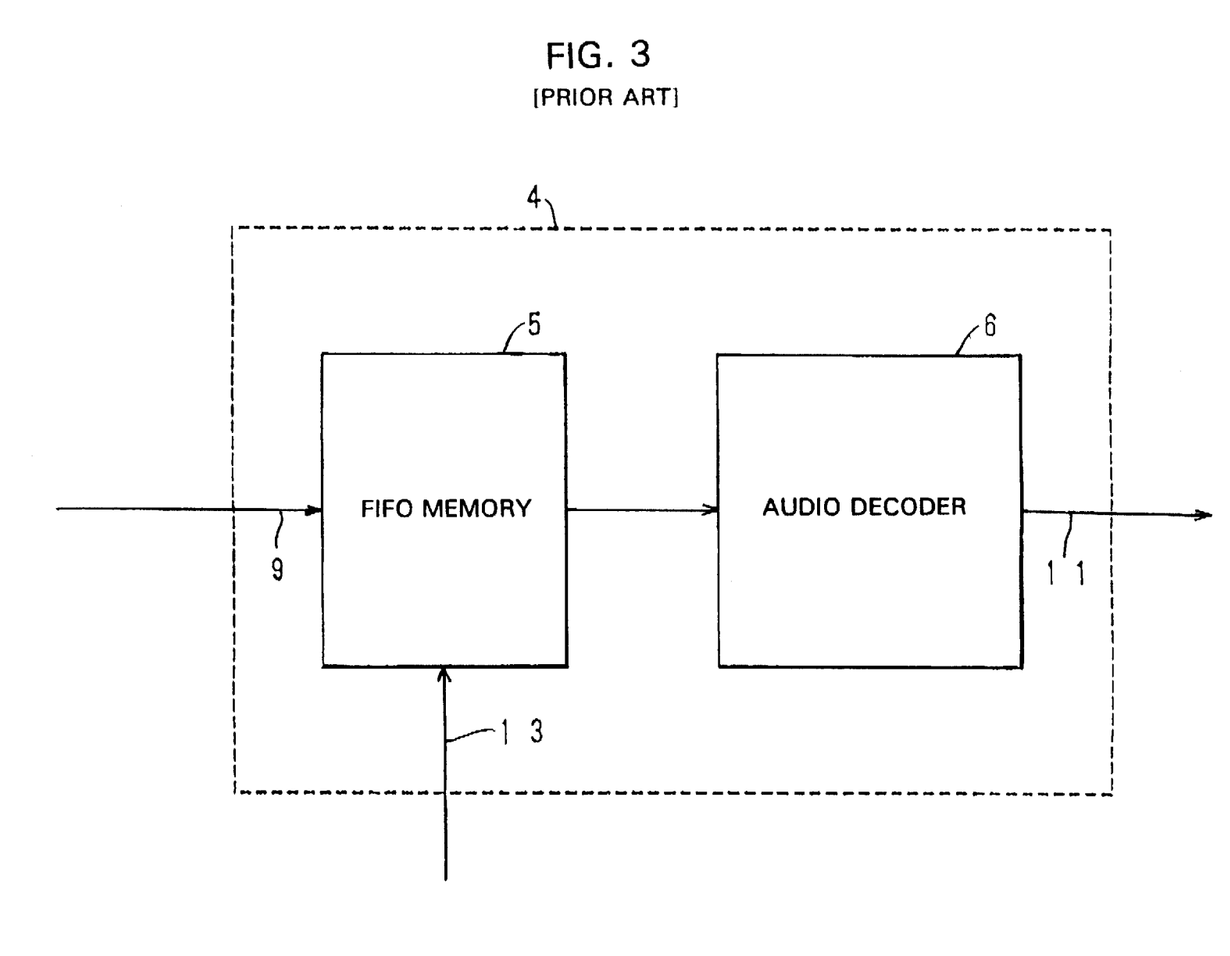
FIG. 3 is a block diagram of a conventional audio decoding unit according to the DTS process.

As shown in FIG. 3, a FIFO memory 5 is a first-in, first-out buffer memory for storing the audio bit stream 9. When an audio start signal 13 is applied to the FIFO memory 5, the FIFO memory 5 starts to output stored data to an audio decoder 6. The audio decoder 6 decodes the audio bit stream 9 into an audio signal 11 and outputs the audio signal 11.

The DTS process will be described below with reference to FIGS. 1 and 3. The A/V separating circuit I separates the audio bit stream 9 from the MPEG bit stream 7, and the FIFO memory 5 of the audio decoding unit 4 stores the separated audio bit stream 9. The synchronization control circuit 3 detects a DTS from the MPEG bit stream 7. The DTS represents a time for the audio decoder 6 to decode the audio bit stream 9. When the DTS is reached, the synchronization control circuit 3 outputs the audio start signal 13 to the FIFO memory 5 of the audio decoding unit 4. The FIFO memory 5 outputs the audio bit stream 9 to the audio decoder 6, which starts decoding the audio bit stream 9. It takes about 10 ms for the audio decoder 6 to decode the audio bit stream 9. Thereafter, the audio decoder 6 outputs the audio signal 11. According to the DTS process, the time required to decode the audio bit stream 9 has already been subtracted, and hence the audio signal 11 can be outputted at a desired time.

Figure 4:
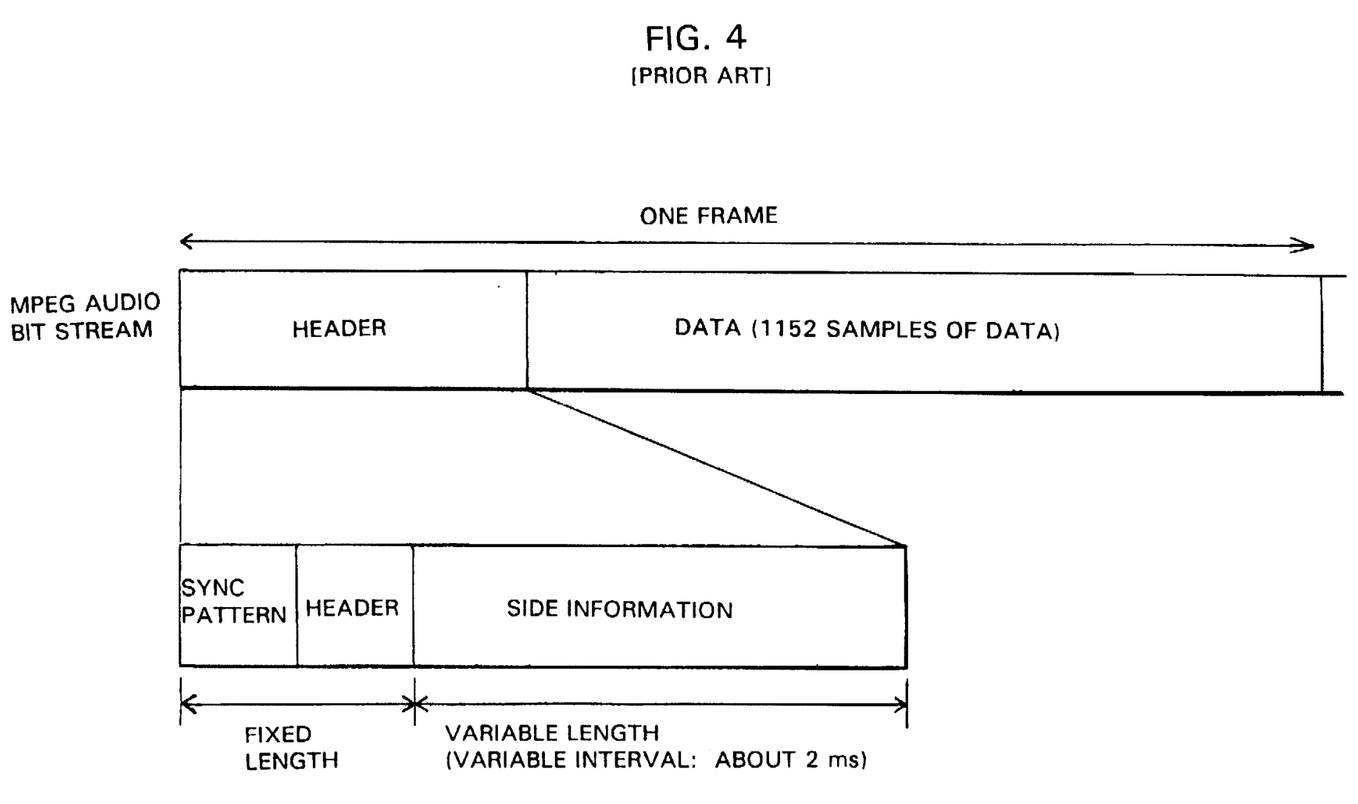
FIG. 4 is a schematic diagram showing an MPEG audio bit stream.

However, since times required to decode audio bit streams are not constant, the DTS process has a problem in that the accuracy of synchronization is poor. FIG. 4 of the accompanying drawings shows the audio bit stream 9. As shown in FIG. 4, the length of side information between a synchronization pattern and data varies in an interval of about 2 ms. Since audio data start being processed at the time when the data begin to be read, even if the processing time is constant, the period of time from the beginning time of the audio bit stream 9 to the time when the audio signal 11 is outputted, i.e., the period of time from the outputting of the audio start signal 13 to the outputting of the audio signal 11, varies by the interval of about 2 ms. Because this period of time depends on the contents of the audio bit stream 9, and cannot be predicted until the audio bit stream 9 is decoded, the period of time causes an error of the synchronization time in the DTS system.

The PTS process is a process which reduces such a time error. The audio decoding unit 4 which operates on the PTS is shown in detail in FIG. 5 of the accompanying drawings.

Figure 5:
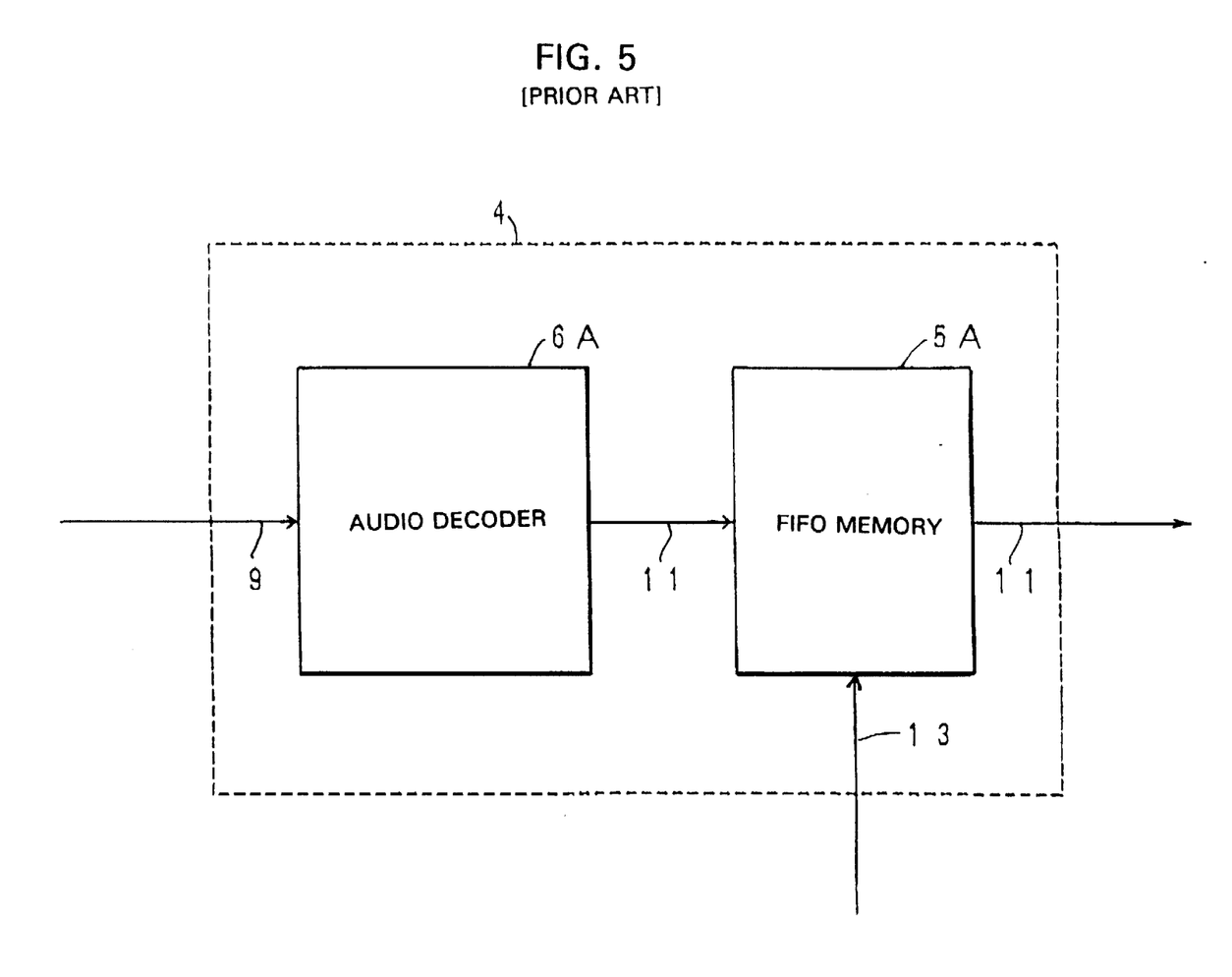
FIG. 5 is a block diagram of a conventional audio decoding unit according to the PTS process.

As shown in FIG. 5, an audio decoder 6A decodes the audio bit stream 9 into an audio signal 11 and outputs the audio signal 11. A FIFO memory 5A is a first-in, first-out buffer memory for storing the audio signal 11. When an audio start signal 13 is applied to the FIFO memory 5, the FIFO memory 5 starts outputting the stored audio signal 11.

The PTS process will be described below with reference to FIGS. 1 and 5. The A/V separating circuit 1 separates the audio bit stream 9 from the MPEG bit stream 7, and supplies the separated audio bit stream 9 to the audio decoder 6A of the audio decoding unit 4. The audio decoder 6A starts decoding the audio bit stream 9. It takes about 10 ms for the audio decoder 6A to decode the audio bit stream 9 into an audio signal 11. Thereafter, the audio decoder 6A outputs the audio signal 11 to the FIFO memory 5A. The synchronization control circuit 3 detects a PTS from the MPEG bit stream 7. The PTS represents a time for the audio decoder 6A to output the audio signal 11. When the PTS is reached, the synchronization control circuit 3 outputs the audio start signal 13 to the FIFO memory 5A of the audio decoding unit 4. Since the FIFO memory 5A has already stored the decoded audio signal 11, the FIFO memory 5A can start to output the audio signal 11 accurately from the time represented by the PTS.

While the PTS process has a reduced error of the synchronization time, the PTS process is disadvantageous in that the storage capacity of the FIFO memory 5A required by the PTS process is relatively large. Specifically, because the audio bit stream represents a compressed audio signal, the FIFO memory 5A according to the PTS process needs a greater storage capacity than the FIFO memory 5 according to the DTS process. If audio signals are compressed to 1/8, then the FIFO memory 5A requires a storage capacity which is 8 times the storage capacity of the FIFO memory 5. For example, if a 16-bit stereo audio signal is sampled at a frequency of 48 kHz, the produced PCM signal has a bit rate:

16×2×48=1536 [kbps].

When the PCM signal is compressed into a bit stream at a compression ratio of 1/8, the bit rate of the produced bit stream is:

1536÷8=192 [kbps].

If data over 0.1 second are to be stored in the FIFO memory for synchronization of the audio signal, then the storage capacity of the FIFO memory according to the DTS process is:

192×0.1=19.2 [kb] (=2.4 kilobytes), and the storage capacity of the FIFO memory according to the PTS process is:

1536×0.1=153.6 [kb] (=19.2 kilobytes).

Therefore, the storage capacity of the FIFO memory according to the PTS process is larger than the storage capacity of the FIFO memory according to the DTS process. As a result, the audio decoding unit 4 operating on the PTS is more expensive than the audio decoding unit 4 operating on the DTS. Furthermore, the FIFO memory 5A for storing 19.2 kilobytes has a large circuit scale and requires a chip area with each side several millimeters long when implemented by an integrated circuit. These limitations impose an obstacle when the audio decoding unit 4 is to be assembled as an integrated circuit.

The above audio signal processing circuit for expanding compressed audio signals has been disadvantageous in that it requires an FIFO memory of large storage capacity if audio signals need to be synchronized accurately with video signals, and it synchronizes audio signals with video signals at inaccurate times if the storage capacity of an FIFO memory is small. Accordingly, it has been impossible to achieve both a small FIFO memory capacity and accurate synchronization times.

SUMMARY OF THE INVENTION

It is an object of the present invention to provide an audio signal processing circuit and a video/audio decoder which can synchronize audio signals accurately with video signals and require an FIFO memory of small storage capacity for synchronization of audio and video signals.

According to the present invention, there is provided an audio signal processing circuit comprising:

a synchronizing pattern detector for being supplied with a bit stream composed of a string of bits representing a compressed digital audio signal, a synchronizing pattern, and format information indicative of a coding format of the compressed digital audio signal, which are arranged in a predetermined format, and detecting the synchronizing pattern from the bit stream supplied thereto;

an unformatter for arraying the compressed digital audio signal according to the format information and outputting subband audio signals;

a synthesizing filter for combining the subband audio signals and outputting an audio signal;

an output latch for temporarily storing and outputting the audio signal; and a sequence generator for being synchronized by the synchronizing pattern and controlling the unformatter, the synthesizing filter, and the output latch, the sequence generator comprising means, responsive to a start signal indicative of starting to output the audio signal, for starting to operate the unformatter and the synthesizing filter to expand the compressed digital audio signal upon detection of the synchronizing pattern, temporarily stopping the operation of the unformatter, the synthesizing filter, and the output latch when a first audio signal is stored in the output latch, and starting to operate the unformatter and the synthesizing filter again in response to the start signal.

According to the present invention, there is also provided a video/audio decoder comprising:

an A/V separating circuit for being supplied with a bit stream composed of a string of bits representing a compressed digital audio signal, a synchronizing pattern, format information indicative of a coding format of the compressed digital audio signal, and a video signal, which are arranged in a predetermined format, and separating the bit stream into a video bit stream and an audio bit stream;

a synchronization control circuit for outputting video and audio start signals in response to the synchronizing pattern in the bit stream;

a video decoding unit for decoding the video bit stream and outputting a video signal in response to the video start signal; and an audio decoding unit for decoding the audio bit stream and outputting an audio signal in response to the audio start signal;

the audio decoding unit including an audio signal processing circuit comprising a synchronizing pattern detector for being supplied with a bit stream composed of a string of bits representing a compressed digital audio signal, a synchronizing pattern, and format information indicative of a coding format of the compressed digital audio signal, which are arranged in a predetermined format, and detecting the synchronizing pattern from the bit stream supplied thereto, an unformatter for arraying the compressed digital audio signal according to the format information and outputting subband audio signals, a synthesizing filter for combining the subband audio signals and outputting an audio signal, an output latch for temporarily storing and outputting the audio signal, and a sequence generator for being synchronized by the synchronizing pattern and controlling the unformatter, the synthesizing filter, and the output latch, the sequence generator comprising means, responsive to a start signal indicative of starting to output the audio signal, for starting to operate the unformatter and the synthesizing filter to expand the compressed digital audio signal upon detection of the synchronizing pattern, temporarily stopping operating the unformatter, the synthesizing filter, and the output latch when a first audio signal is stored in the output latch, and starting to operate the unformatter and the synthesizing filter again in response to the start signal, and an FIFO memory for storing the audio bit stream and outputting the stored audio bit stream to the synchronizing pattern detector.

With the above circuit arrangement, a compressed audio bit stream is stored in a memory, and a compressed digital audio signal is expanded upon detection of a synchronizing pattern. When one sample of an audio signal is latched, operation of the circuit is stopped. The circuit starts to operate again in response to an audio start signal, for thereby starting to output the audio signal.

The memory may have a storage capacity just large enough to store the audio bit stream in the period of time from the time when the audio bit stream start to be inputted to the time when the audio signal starts to be outputted. This storage capacity is the same as the storage capacity of a memory according to the DTS process, and hence may be relatively small. The processing operation before the operation of the circuit is stopped and after the operation of the circuit is resumed is the same as an ordinary decoding process. Since the processing operation is stopped at the time when the audio signal is just about to be outputted, and the audio signal starts to be outputted immediately after the audio start signal is inputted, the audio signal can be synchronized with a video signal as accurately as with the PTS process.

While the conventional DTS process suffers an error of about 2 ms with respect to the synchronizing signal, any error with respect to the synchronizing signal is substantially nil according to the present invention. The storage capacity of the FIFO memory according to the present invention is about ⅛ of the storage capacity of the conventional FIFO memory according to the PTS process if the compression ratio is ⅛.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 6:
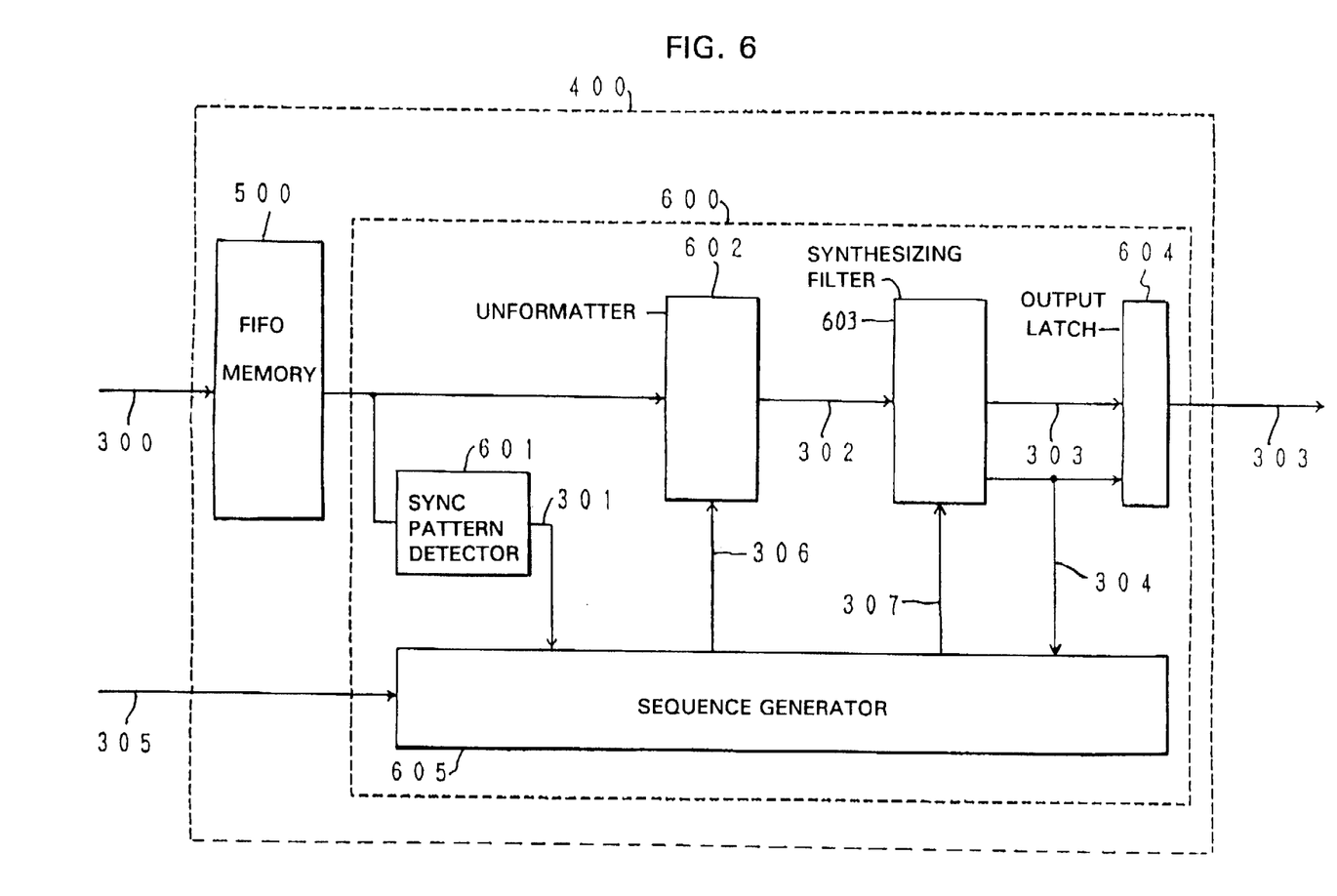
FIG. 6 is a block diagram of an audio signal processing circuit according to the present invention.

As shown in FIG. 6, an audio signal processing circuit according to the present invention comprises an audio decoding unit 400 for decoding an audio bit stream 300 into an audio signal 303 and outputting the audio signal 303. The audio decoding unit 400 corresponds to the conventional audio decoding unit 4. The audio bit stream 300 comprises a string of bits representing a compressed digital audio signal, a synchronizing pattern, and format information indicative of a coding format of the compressed digital audio signal, which are arranged in a predetermined format.

The audio decoding unit 400 includes an FIFO memory 500 which is a first-in, first-out memory for storing the audio bit stream 300. The FIFO memory 500 corresponds to the conventional FIFO memory 5. The audio decoding unit 400 also includes an audio decoder 600 according to the present invention, the audio decoder 600 corresponding to the conventional audio decoders 6, 6A. The audio decoder 600 has a synchronizing pattern detector 601 for detecting a synchronizing pattern at the beginning of the audio bit stream 300, and outputs a sequence start signal 301. An unformatter 602 converts numerical values in data of the audio bit stream 300 into real values, arrays the real values, and outputs subband audio signals 302. At this time, information in the data is modified using information such as a scale factor represented by the side information, and arranged for each side band and successively outputted. A synthesizing filter 603 synthesizes the subband audio signals 302 into an audio signal 303 and outputs the audio signal 303. The synthesizing filter 603 also outputs a latch signal 304 for latching an audio signal each time it outputs one sample of audio signal. An output latch 604 comprises a 16-bit latch for temporarily storing one sample of audio signal. The output latch 604 latches the audio signal 303 in response to the latch signal 304, and outputs the latched audio signal 303.

A sequence generator 605 serves to control the unformatter 602 and the synthesizing filter 603 with respective control signals 306, 307.

An audio start signal 305 supplied to the sequence generator 605 comprises a PTS signal.

Figure 7:
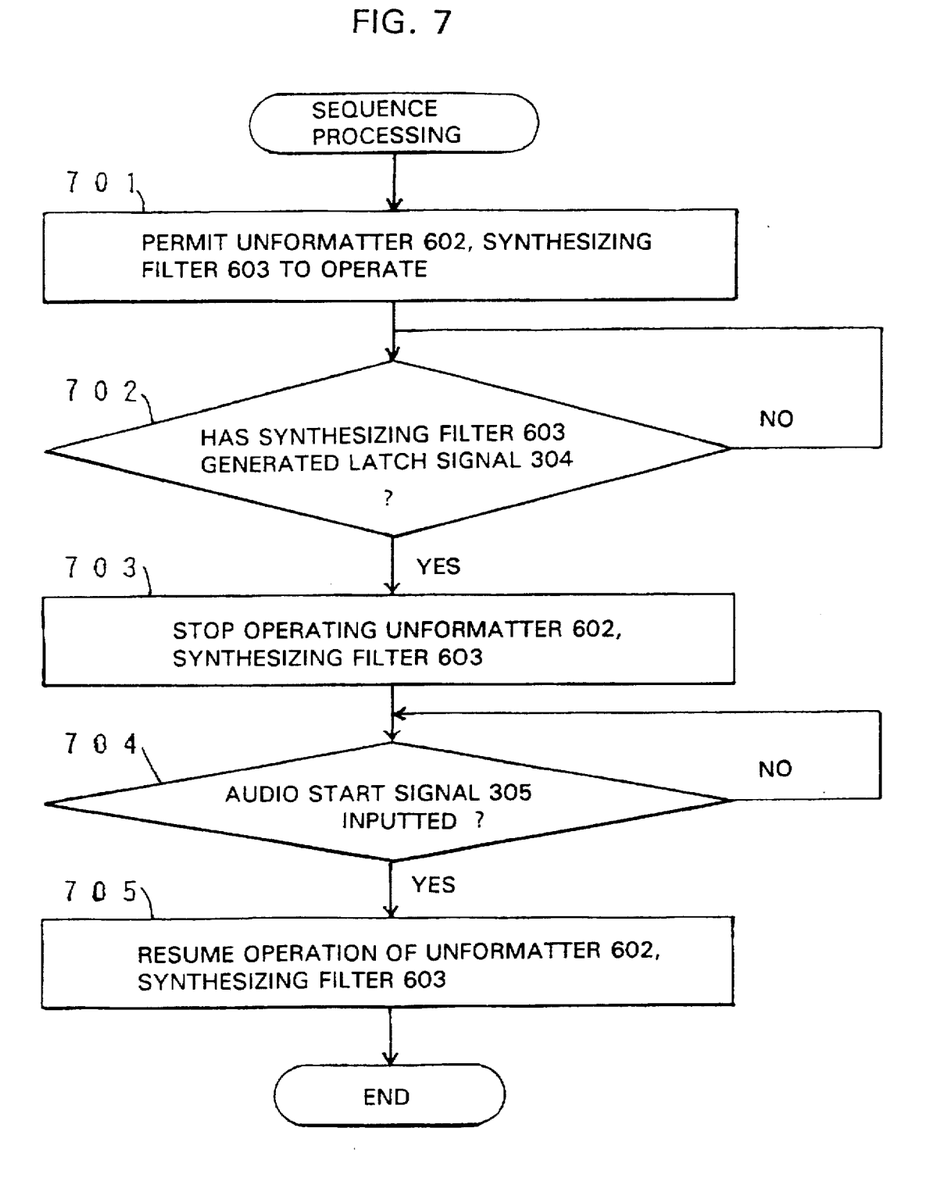
FIG. 7 is a flowchart of an operation sequence of a sequence generator in the audio signal processing circuit shown in FIG. 6.

Operation of the sequence generator 305 will be described below with reference to FIG. 7.

When the synchronizing pattern detector 601 detects a synchronizing pattern, the sequence generator 305 starts a sequence control process. First, the sequence generator 305 starts to operate the unformatter 602 and the synthesizing filter 603 in a step 701. The unformatter 602 and the synthesizing filter 603 successively read the header, the-side information, and the data following the synchronizing pattern of the audio bit stream 300 from the FIFO memory 500, and unformat and synthesize them, respectively. One frame of the audio bit stream 300 contains 1152 samples of data. When the first one sample of data is synthesized, the synthesizing filter 603 outputs an audio signal 303 and a latch signal 304. When the latch signal 304 is generated in a step 702, the sequence generator 305 stops the operation of the unformatter 602 and the synthesizing filter 603 in a step 703. Therefore, when the first one sample of the audio signal is stored in the output latch 604, the unformatter 602 and the synthesizing filter 603 are temporarily switched out of operation. The period of time from the time when the audio bit stream 300 starts being inputted to the step 703 has an interval of 2 ms as it contains a time to read the side information, and is not definitely defined.

When a time given by the PTS is reached, the audio start signal 305 is applied to the sequence generator 605. In response to the start signal 305 in a step 704, the sequence generator 605 then starts to operate the unformatter 602 and the synthesizing filter 603 again in a step 705. Since the unformatter 602 and the synthesizing filter 603 resume their processing operation from the condition in which the first one sample of the audio signal has been outputted, and successively output second, third, and following samples, the audio signal 303 starts being outputted immediately when the audio start signal 305 is inputted. Stated otherwise, the audio signal 303 starts being outputted exactly at the time represented by the PTS.

The FIFO memory 500 is required to have a storage capacity just large enough to store the audio bit stream 300 in the period of time from the time when the audio bit stream 303 starts to be inputted to the time when the audio signal 303 starts to be outputted. The storage capacity of the FIFO memory 500 is therefore relatively small as it is the same as the storage capacity of the FIFO memory according to the DTS process.

While a preferred embodiment of the invention has been described using specific terms, such description is for illustrative purposes only, and it is to be understood that changes and variations may be made without departing from the spirit or scope of the following claims.

Waht is claimed is:

1. An audio signal processing circuit comprising:
   a synchronizing pattern detector for being supplied with a bit stream composed of a string of bits representing a compressed digital audio signal, a synchronizing pattern, and format information indicative of a coding format of the compressed digital audio signal, which are arranged in a predetermined format, and detecting said synchronizing pattern from the bit stream supplied thereto;
   an unformatter for arraying said compressed digital audio signal according to said format information and outputting subband audio signals;
   a synthesizing filter for combining said subband audio signals and outputting an audio signal;
   an output latch for temporarily storing and outputting said audio signal; and
   a sequence generator for being synchronized by said synchronizing pattern and controlling said unformatter, said synthesizing filter, and said output latch, said sequence generator comprising means, responsive to a start signal indicative of starting to output said audio signal, for starting to operate said unformatter and said synthesizing filter to expand said compressed digital audio signal upon detection of said synchronizing pattern, temporarily stopping operating said unformatter, said synthesizing filter, and said output latch when a first audio signal is stored in said output latch, and starting to operate said unformatter and said synthesizing filter again in response to said start signal.

2. A video/audio decoder comprising:
   an A/V separating circuit for being supplied with a bit stream composed of a string of bits representing a compressed digital audio signal, a synchronizing pattern, format information indicative of a coding format of the compressed digital audio signal, and a video signal, which are arranged in a predetermined format, and separating said bit stream into a video bit stream and an audio bit stream;
   a synchronization control circuit for outputting video and audio start signals in response to the synchronizing pattern in said bit stream;
   a video decoding unit for decoding said video bit stream and outputting a video signal in response to the video start signal; and
   an audio decoding unit for decoding said audio bit stream and outputting an audio signal in response to the audio start signal;
   said audio decoding unit including an audio signal processing circuit comprising a synchronizing pattern detector for being supplied with a bit stream composed of a string of bits representing a compressed digital audio signal, a synchronizing pattern, and format information indicative of a coding format of the compressed digital audio signal, which are arranged in a predetermined format, and detecting said synchronizing pattern from the bit stream supplied thereto, an unformatter for arraying said compressed digital audio signal according to said format information and outputting subband audio signals, a synthesizing filter for combining said subband audio signals and outputting an audio signal, an output latch for temporarily storing and outputting said audio signal, a sequence generator for being synchronized by said synchronizing pattern and controlling said unformatter, said synthesizing filter, and said output latch, said sequence generator comprising means, responsive to a start signal indicative of starting to output said audio signal, for starting to operate said unformatter and said synthesizing filter to expand said compressed digital audio signal upon detection of said synchronizing pattern, temporarily stopping the operation of said unformatter, said synthesizing filter, and said output latch when a first audio signal is stored in said output latch, and starting to operate said unformatter and said synthesizing filter again in response to said start signal, and an FIFO memory for storing said audio bit stream and outputting the stored audio bit stream to said synchronizing pattern detector and said unformatter.

* * * * *

UNITED STATES PATENT AND TRADEMARK OFFICE
CERTIFICATE OF CORRRECTION

PATENT NO. : 5,761,437  
DATED : June 2, 1998  
INVENTOR(S) : Takano et al.

Page 1 of 2

It is certified that error appears in the above-identified patent and that said Letters Patent is hereby corrected as shown below:

On the title page add the following to item [56]

FOREIGN PATENT OR PUBLISHED FOREIGN PATENT APPLICATION

| | | DOCUMENT NUMBER | | | | | PUBLICATION DATE | COUNTRY OR PATENT OFFICE | CLASS | SUBCLASS | TRANSLATION | |
|---|---|---|---|---|---|---|---|---|---|---|---|---|
| | | | | | | | | | | | YES | NO |
| | | 94 | 3 | 0 | 0 | 1 | 4 | 12/22/94 | WIPO | | | |
| | | 6 | 1 | 8 | 7 | 8 | 2 | 10/05/94 | European | | | |
| | | 6 | 0 | 2 | 9 | 4 | 3 | 06/22/94 | European | | | |
| | | 5 | 9 | 9 | 3 | 1 | 5 | 06/01/94 | European | | | |
| | | | | | | | | | | | | |

UNITED STATES PATENT AND TRADEMARK OFFICE
CERTIFICATE OF CORRRECTION

PATENT NO. : 5,761,437
DATED : June 2, 1998
INVENTOR(S) : Takano et al.

It is certified that error appears in the above-identified patent and that said Letters Patent is hereby corrected as shown below:

On the title page add the following to item [56]
OTHER DOCUMENTS

| | | |
|---|---|---|
| | | Pan, D., "An Overview of the MPEG/Audio Compression Algorithm", PROCEEDINGS OF THE SPIE - THE INTERNATIONAL SOCIETY FOR OPTICAL ENGINEERING, VOL. 2187, February 7, 1994, pp. 260-293. |
| | | Schroder, et al., "Der MPEG-2-Standard: Audio Codierung (Teil 4)", FERNSEH UND KINOTECHNIK, vol. 48, no. 7/8, August 30, 1994, pp. 364-373. |
| | | |

Signed and Sealed this

Sixth Day of April, 1999

Attest:

Q. TODD DICKINSON

*Attesting Officer*    *Acting Commissioner of Patents and Trademarks*